US008357303B2

(12) United States Patent
Angeles-Boza et al.

(10) Patent No.: US 8,357,303 B2
(45) Date of Patent: Jan. 22, 2013

(54) METHOD FOR REMOVING METAL CONTAMINANTS FROM A METAL CONTAINING SOLUTION

(75) Inventors: Alfredo M. Angeles-Boza, College Station, TX (US); Charles R. Landis, The Woodlands, TX (US); William W. Shumway, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 774 days.

(21) Appl. No.: 11/849,867

(22) Filed: Sep. 4, 2007

(65) Prior Publication Data

US 2009/0057232 A1    Mar. 5, 2009

(51) Int. Cl.
  *C02F 1/28*    (2006.01)
  *C02F 101/22*   (2006.01)
(52) U.S. Cl. ........ 210/674; 210/679; 210/888; 210/912; 210/913; 210/914
(58) Field of Classification Search .......... 210/679, 210/688, 912, 913, 914, 674
See application file for complete search history.

(56) References Cited

U.S. PATENT DOCUMENTS

| | | | |
|---|---|---|---|
| 4,033,764 A | | 7/1977 | Colegate et al. |
| 4,386,010 A | | 5/1983 | Hildebrandt |
| 4,866,018 A | * | 9/1989 | Elliot ............................ 501/148 |
| 5,401,417 A | * | 3/1995 | Dentel et al. .................. 210/674 |
| 5,512,526 A | * | 4/1996 | Greco ............................ 502/80 |
| 6,881,346 B2 | | 4/2005 | Landis et al. |
| 7,048,781 B1 | | 5/2006 | Lovell |
| 7,063,804 B2 | | 6/2006 | Landis et al. |
| 7,183,235 B2 | | 2/2007 | Lovell et al. |
| 7,201,856 B2 | | 4/2007 | Souter et al. |
| 7,309,676 B2 | | 12/2007 | Mouri et al. |
| 2008/0302727 A1 | * | 12/2008 | Wang et al. .................. 210/688 |

OTHER PUBLICATIONS

Celis, Rafael, et al., "Heavy metal adsorption by functionalized clays," XP-002505866, Environmental Science & Technology, 2000, pp. 4593-4599, vol. 34, No. 21, American Chemical Society.
Cruz-Guzmán, M., et al., "Heavy metal adsorption by montmorillonites modified with natural organic cations," XP-002505865, Soil Sci. Soc. Am. J., 2006, pp. 215-221, vol. 70, Soil Science Society of America.

(Continued)

*Primary Examiner* — Matthew O Savage
(74) *Attorney, Agent, or Firm* — Craig Roddy; Conley Rose, P.C.

(57) ABSTRACT

A method for removing a metal from a metal-containing solution comprising contacting the metal-containing solution with a metal-removing composition comprising a substrate, an organic ion, and a metal binding agent, and recovering a solution having a lowered metal concentration when compared to the metal-containing solution. A composition comprising a substrate, an organic ion, and a metal binding agent, wherein the substrate comprises a natural clay, a synthetic clay, a natural zeolite, a synthetic zeolite, a polymer resin, lignite, kaolinite, serpentine, illite, chlorite, smectite, montmorillonite, saponite, sepiolite, nontronite, beidellite, hectorite, fuller's earth, attapulgite, bentonite, analcime, chabazite, heulandite, natrolite, phillipsite, stilbite, diethyl aminoethyl, quaternary aminoethyl, or combinations thereof, wherein the organic ion comprises quaternary amines, imidazolium salts, phosphonium salts, tetra alkyl ammonium, bis-(hydrogenated tallow)-dimethyl-ammonium chloride, bis-(hydrogenated tallow)-benzyl-methyl-ammonium chloride, 4,5-dihydro-1-methyl-2-nortallow-alkyl-1-(2-tallow-amidoethyl)-imidazolium methyl sulfate, 1-ethyl-4,5-dihydro-3-(2-hydroxyethyl)-2-(8-heptadecenyl)-imidazolium ethyl sulfate, or combinations thereof, and wherein the metal-binding agent comprises mercaptan, carboxylic acid, chelating agents, amines, esters, carboxylic acids, alcohols, ethers, aldehydes, ketones, alkenes, alkynes, mercaptans, thiols, tert-dodecanethiol, nonanethiol, octanethiol, n-stearic acid, isostearic acid, palmitic acid, or combinations thereof.

25 Claims, 4 Drawing Sheets

OTHER PUBLICATIONS

Dias Filho, Newton L, et al., Study of an organically modified clay: selective adsorption of heavy metal ions and voltammetric determination of mercury(II), Talanta, 2006, pp. 919-927, vol. 68, Elsevier B.V.

Foreign communication from a related counterpart application—International Search Report and Written Opinion, PCT/GB2008/002972, Dec. 15, 2008, 17 pages.

Haggerty, Grace M., et al., "Sorption of chromate and other inorganic anions by organo-zeolite," XP-002505941, Environ. Sci. Technol., 1994, pp. 452-458, vol. 28, No. 3, American Chemical Society.

Leszczyńska, A., et al., "Polymer/montmorillonite nanocomposites with improved thermal properties Part I. Factors influencing thermal stability and mechanisms of thermal stability improvement," XP-002505942, Thermochimica Acta, 2007, pp. 75-96, vol. 453, Elsevier B.V.

Malakul, Pomthong, et al., "Metal adsorption and desorption characteristics of surfactant-modified clay complexes," XP-002505862, Ind. Eng. Chem. Res., 1998, pp. 4296-4301, vol. 37, No. 11, American Chemical Society.

Say, Ridvan, et al., "Removal of heavy metal ions by dithiocarbamate-anchored polymer/organosmectite composites," XP-002505863, Applied Clay Science, 2006, pp. 298-305, vol. 31, Elsevier B.V.

Janks, J. S., et al., "Identification and properties of modified zeolites for the removal of benzene, toluene, and xylene from aqueous solutions," SPE 22833, Oct. 1991, pp. 153-167, Society of Petroleum Engineers, Inc.

* cited by examiner

METHOD FOR REMOVING METAL CONTAMINANTS FROM A METAL CONTAINING SOLUTION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD

The present disclosure relates to compositions and methods for metal removal. More specifically, the present disclosure relates to compositions and methods for removal of one or more metal contaminants from a solution.

BACKGROUND

There are a variety of mechanisms by which metal contaminants are introduced to community resources such as the water supply. The introduction of metal contaminants can be attributed to sources such as untreated waste discharges; discharges of industrial effluent containing chemicals; run-off from agricultural fields containing pesticides; leaks from water pipe joints in areas where water pipe and sewage line pass close together; discharges from mining waste and tailings; seepage from landfills, or hazardous waste dumps; and corrosion from pipes, fittings, solder, or plumbing. The level of tolerance for such metal contaminants is low as exposure of an organism to a variety of metals (e.g., heavy metals) at even relatively low concentrations can result in a variety of adverse effects spanning from both chronic and acute illnesses to the generation of water-borne diseases. These effects can be the result of exposure to high levels of these metals in a single dose or be the result of the accumulation of these metals in an organism over a longer duration by repeated exposure. Thus, a need exists for an improved method for removing the metal contaminants from liquids.

SUMMARY

Disclosed herein is a method for removing a metal from a metal-containing solution comprising contacting the metal-containing solution with a metal-removing composition comprising a substrate, an organic ion, and a metal binding agent, and recovering a solution having a lowered metal concentration when compared to the metal-containing solution. The metal-containing solution may comprise a metal, a heavy metal, or combinations thereof. The metal or heavy metal may comprise lead, iron, arsenic, mercury, copper, manganese, chromium, barium, cadmium, selenium, antimony, beryllium, nickel, thallium, or combinations thereof. The metal and/or heavy metal may be present in the metal-containing solution in an amount of equal to or less than about 10000 ppm.

The substrate may comprise a natural clay, a synthetic clay, a natural zeolite, a synthetic zeolite, a polymer resin, lignite, or combinations thereof. The clay may comprise kaolinite, serpentine, illite, chlorite, smectite or combinations thereof. The smectite may comprise montmorillonite, saponite, sepiolite, nontronite, beidellite, hectorite, fuller's earth, attapulgite, or combinations thereof. The zeolite may comprise analcime, chabazite, heulandite, natrolite, phillipsite, stilbite, or combinations thereof. The polymer resin may comprise diethyl aminoethyl, quaternary aminoethyl, or combinations thereof. The substrate may be present in an amount of from about 30% to about 90% by weight of the metal-removing composition.

The organic ion may comprise quaternary amines, imidazolium salts, phosphonium salts, or combinations thereof. The quaternary amines may comprise tetra alkyl ammonium, bis-(hydrogenated tallow)-dimethyl-ammonium chloride, bis-(hydrogenated tallow)-benzyl-methyl-ammonium chloride, or combinations thereof. The imidazolium salts may comprise 4,5-dihydro-1-methyl-2-nortallow-alkyl-1-(2-tallow-amidoethyl)-imidazolium methyl sulfate, 1-ethyl-4,5-dihydro-3-(2-hydroxyethyl)-2-(8-heptadecenyl)-imidazolium ethyl sulfate, or combinations thereof. The organic ion may be present in an amount of from about 10% to about 70% by weight of the removing composition.

The metal-binding agent may comprise a mercaptan, a carboxylic acid, a chelating agent, or combinations thereof. The chelating agent may comprise amines, esters, carboxylic acids, alcohols, ethers, aldehydes, ketones, alkenes, alkynes, mercaptans, thiols, or combinations thereof. The mercaptan may comprise tert-dodecanethiol, nonanethiol, octanethiol, or combinations thereof. The carboxylic acid may comprise n-stearic acid, iso-stearic acid, palmitic acid, or combinations thereof. The metal-binding agent may comprise an alkyl group comprising from about 2 to about 30 carbons. The metal-binding agent may be present in an amount of equal to or less than about 30% by weight of the removing composition.

The ratio of the metal-containing solution to the metal-removing composition may be about 50:50. The metal-removing composition may reduce the amount of metal in the metal-containing solution by equal to or greater than about 75%. The metal-containing solution and metal-removing composition may be contacted for a period of equal to or greater than about 5 minutes. The method may further comprise separating the solution having a lowered metal concentration from the metal-removing composition via filtration, particle filtration, particle settling, microfiltration, ultrafiltration, nanofiltration, reverse osmosis, centrifuge, screening, or combinations thereof.

Also disclosed herein is a composition comprising a substrate, an organic ion, and a metal binding agent. The substrate may comprise a natural clay, a synthetic clay, a natural zeolite, a synthetic zeolite, a polymer resin, lignite, or combinations thereof. The clay may comprise kaolinite, serpentine, illite, chlorite, smectite or combinations thereof. The smectite may comprise montmorillonite, saponite, sepiolite, nontronite, beidellite, hectorite, fuller's earth, attapulgite, or combinations thereof. The smectite may comprise bentonite. The zeolite may comprise analcime, chabazite, heulandite, natrolite, phillipsite, stilbite, or combinations thereof. The polymer resin may comprise diethyl aminoethyl, quaternary aminoethyl, or combinations thereof.

The organic ion may comprise quaternary amines, imidazolium salts, phosphonium salts, or combinations thereof. The quaternary amines may comprise tetra alkyl ammonium, bis-(hydrogenated tallow)-dimethyl-ammonium chloride, bis-(hydrogenated tallow)-benzyl-methyl-ammonium chloride, or combinations thereof. The imidazole salts may comprise 4,5-dihydro-1-methyl-2-nortallow-alkyl-1-(2-tallowamidoethyl)-imidazolium methyl sulfate, 1-ethyl-4,5-dihydro-3-(2-hydroxyethyl)-2-(8-heptadecenyl)-imidazolium ethyl sulfate, or combinations thereof.

The metal-binding agent may comprise mercaptan, carboxylic acid, chelating agents, or combinations thereof. The chelating agent may comprise, amines, esters, carboxylic acids, alcohols, ethers, aldehydes, ketones, alkenes, alkynes, mercaptans, thiols, and or combinations thereof. The mercaptan may comprise tert-dodecanethiol, nonanethiol, octanethiol, or combinations thereof. The carboxylic acid may comprise n-stearic acid, iso-stearic acid, palmitic acid, or combinations thereof. The metal-binding agent may comprise an alkyl group comprising from about 2 to about 30 carbons.

The substrate may be present in an amount of from about 30% to about 90% by weight of the composition. The organic ion may be present in an amount of from about 10% to about 70% by weight of the composition. The metal-binding agent may be present in an amount of equal to or less than about 30% by weight of the composition. The composition may have an effective functionality to remove metal, heavy metal, or both from a solution.

Further disclosed herein is a composition comprising a substrate, an organic ion, and a metal-binding agent wherein the organic ion may comprise a tetraalkyl ammonium salt and the metal-binding agent may comprise a mercaptan. The substrate may comprise a smectite.

DETAILED DESCRIPTION

While the disclosure is susceptible to various modifications and alternative forms, specific embodiments thereof are shown by way of example in the figures and will herein be described in detail. It is to be understood, however, that the figures and detailed description thereto are not intended to limit the disclosure to the particular form disclosed, but on the contrary, the disclosure is to cover all modifications, equivalents and alternatives falling within the spirit and scope of the present disclosure as defined by the appended claims.

Disclosed herein are compositions and methods for removing a metal from a metal-containing solution. In an embodiment, the method comprises contacting the metal-containing solution with a metal-removing composition (MRC) comprising a substrate, an organic ion, and a metal-binding agent.

As disclosed herein, the term "metal-containing solution" (MCS) is meant to include any solution (e.g., aqueous) that comprises at least one metal, alternatively comprises at least one heavy metal. Heavy metals refer to higher atomic weight elements, which have the properties of a metallic substance at room temperature. Examples of such heavy metals include without limitation lead, iron, arsenic, mercury, copper, manganese, chromium, barium, cadmium, selenium, antimony, beryllium, nickel, thallium, or combinations thereof.

In an embodiment, the MCS may comprise aqueous solutions obtained from a variety of sources wherein the aqueous solutions comprise at least one heavy metal. For example, the MCS may comprise ground water, surface water, industrial and/or domestic waste, tap water, or combinations thereof. In an embodiment, the MCS comprises water produced from a subterranean formation such as for example a wellbore. Heavy metals (e.g. iron, lead) may be present in the untreated MCS in an amount of equal to or less than about 10,000 parts per million (ppm), alternatively in an amount from about 0.05 ppm to about 5000 ppm, or alternatively in an amount of from about 0.1 ppm to about 1000 ppm. In another embodiment, the metal may be present in the untreated MCS in an amount of up to 1000 ppm.

Figure 1:
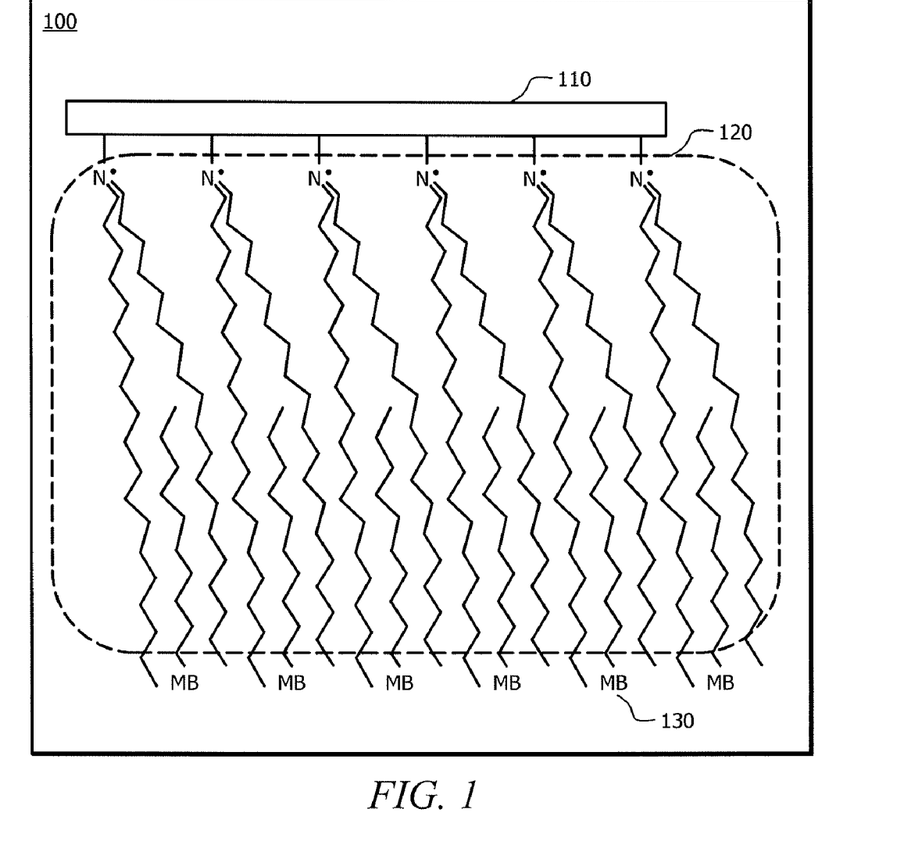
FIG. 1 is an illustration of a metal-removing composition.

In an embodiment, the MCS may be contacted with a metal-removing composition (MRC) wherein the MRC comprises a substrate, an organic ion, and a metal binding agent. An embodiment of a MRC is shown in FIG. 1. Referring to FIG. 1, the MRC 100 comprises a substrate 110 which is associated with an organic ion 120 which in turn is associated with a metal-binding agent 130. Such compositions may also be referred to as metal sorbents.

In an embodiment the MRC comprises a substrate. The substrate may be an organic or an inorganic material. The substrate may be further characterized as hydrophobic, alternatively the substrate is hydrophilic. Examples of materials suitable for use as the substrate in the MRC include without limitation clay, zeolite, polymeric resin, lignite, or combinations thereof.

In an embodiment, the substrate comprises a clay. Clays herein refer to aggregates of hydrous silicate particles either naturally occurring or synthetically produced, less than 4 micrometers ($\mu m$) in diameter and may consist of a variety of minerals rich in silicon and aluminum oxides and hydroxides which include variable amounts of other components such as alkali earth metals and water. Clays are most commonly formed by chemical weathering of silicate-bearing rocks, although some are formed by hydrothermal activity. These clays can be replicated in industrial chemical processes. Examples of clays suitable for use in this disclosure include without limitation clays from the following groups: kaolinite, serpentine, illite, chlorite, smectite or combinations thereof. Example of suitable kaolinite group clays include without limitation kaolinite, dickite, halloysite, nacrite, or combinations thereof. Examples of suitable illite groups include clay-micas and illite.

In an embodiment, the clay comprises a smectite. Examples of smectites suitable for use in this disclosure include without limitation montmorillonite, saponite, sepiolite, nontronite, beidellite, hectorite, fuller's earth, attapulgite or combinations thereof. In another embodiment, the smectite comprises a montmorillonite, for example a bentonite.

In an embodiment, the substrate comprises a zeolite. Zeolites are three-dimensional, microporous, crystalline solids with well-defined porous structures. Zeolites, which can be either naturally occurring or synthesized, comprise a group of hydrated alumina silicates that are linked in a three dimensional framework through shared oxygen atoms. Examples of zeolites suitable for use in this disclosure include without limitation analcime, chabazite, heulandite, natrolite, phillipsite, stilbite, or combinations thereof.

In an embodiment, the substrate comprises a polymeric resin such as for example an ion-exchange resin. Ion exchange resins are polymeric resins that contain charged functional groups. The base polymer is usually a crosslinked material such as polystyrene that is crosslinked with a vinyl polymer Examples of polymeric resins suitable for use in this disclosure include without limitation diethyl aminoethyl, quaternary aminoethyl, Mono-Q, Mono-S, or combinations thereof, all of which are commercially available from Pharmacia Biotech.

In an embodiment, the substrate comprises a lignite. Lignite is a brownish black coal that has high inherent moisture content and high ash content compared to bituminous coal. It is a heterogenous mixture and often has a woodlike texture. Lignite may have a heat content ranging from about 10 MJ/kg to about 20 MJ/kg.

In some embodiments, the substrate may be obtained from natural sources, alternatively the substrate may comprise synthetic analogs of the materials described herein. Such synthetic analogs and methods of preparing same are known to one of ordinary skill in the art.

In an embodiment, the substrate may be present in amount of from about 30% to about 90%, alternatively from about 65% to about 85%, or alternatively from about 70% to about 80% by weight of the MRC.

In an embodiment, the MRC comprises an organic ion. The organic ion may include any postively charged organic molecule. In some embodiments, the organic ion may be an oil wetting agent, a bactericide, or combinations thereof. For example, the organic ion may comprise a quarternary amine, imidazolium salt, phosphonium salt, or combinations thereof Examples of suitable quaternary amines include without limitation tetra alkyl ammonium, bis-(hydrogenated tallow)-dimethyl-ammonium chloride, bis-(hydrogenated tallow)-benzyl-methyl-ammonium chloride, or combinations thereof. Examples of suitable imidazolium salts include without limitation 4,5-dihydro-1-methyl-2-nortallow-alkyl-1-(2-tallow-amidoethyl)-imidazolium methyl sulfate, 1-ethyl-4,5-dihydro-3-(2-hydroxyethyl)-2-(8-heptadecenyl)-imidazolium ethyl sulfate.

In an embodiment, the organic ion is present in an amount of from about 10% to about 70%, aternatively from about 15% to about 35%, or alternatively from about 25% to about 30% by weight of the MRC.

In an embodiment, the MRC comprises a metal-binding agent. The metal-binding agent may function to bind and remove the metals from the MCS. In an embodiment, the metal-binding agent comprises at least one metal-binding functional group and a hydrophobic group.

In an embodiment, the metal-binding functional group comprises a mercaptan. Mercaptans, also known as thiols, are sulfur-containing organic compounds comprising the functionality generally represented as [—SH]. Examples of suitable mercaptans include without limitation tert-dodecanethiol, nonanethiol, octanethiol, or combinations thereof. In an embodiment, the thiol may comprise from 6 to 30 carbon atoms.

In an embodiment, the metal-binding functional group comprises a carboxylic acid. A carboxylic acid is an organic acid characterized by the presence of a carboxyl group which is represented as [—C(=O)OH]. Examples of carboxylic acids suitable for use in this disclosure include without limitation n-stearic acid, iso-stearic acid, palmitic acid, or combinations thereof.

In an embodiment, the metal binding agent may have both mercaptan and carboxylic acid functionalities. Alternatively the metal-binding agent comprises a compound such as a chelating agent (also termed coordinating agent) having a plurality of metal-binding functionalities. Chelating agents generally refer to compounds having the ability to coordinate a metal through more than one bond. For example, a chelating agent may have one mercaptan group and one carboxylic acid group, alternatively two mercaptan groups and two carboxylic acid groups. Alternatively, the chelating agent may comprise amines, esters, carboxylic acids, alcohols, ethers, aldehydes, ketones, alkenes, alkynes, mercaptans, thiols, or combinations thereof.

In an embodiment, the metal-binding agent comprises a hydrophobic group which is bonded to the metal-binding functionality (e.g. mercaptan, carboxylic acid, chelating agent) and may be any hydrophobic group compatible with the metal-binding agent and the other components of the MRC. In an embodiment, the hydrophobic group comprises an alkyl group having n carbon atoms wherein n is from about 2 to about 30, alternatively from about 5 to about 25, alternatively from about 10 to about 20. The hydrophobic group may be chosen (e.g. length of the alkyl chain) to meet the needs of the process and overall may function to increase the hydrophobicity of the MRC. Without wishing to be limited by theory, the substrate which may initially be hydrophilic, after association with an organic ion and/or the metal-binding agent having a hydrophobic group may display an increased degree of hydrophobicity. Alternatively, the substrate chosen may be hydrophobic in nature and the hydrophobicity of the substrate would again be increased by association of the substrate with the metal-binding agent and/or the organic ion. The degree of hydrophobicity can be adjusted by one skilled in the art by adjusting the nature of the hydrophobic group (e.g. length of the alkyl chain).

In an embodiment, the metal-binding agent is present in an amount of equal to or less than about 30%, or alternatively equal to or less than about 10%, or alternatively equal to or less than about 5% by weight of the MRC.

The amounts of all components of the MRC presented herein are by way of example. It is to be understood these amounts may be adjusted accordingly by one of ordinary skill in the art using the benefit of the present disclosure in order to prepare a composition that functions within the spirit and scope defined herein.

The MRC may be prepared by contacting the substrate with the organic ion, where both the substrate and organic ions are solids, to form a solid mixture. Alternatively, the MRC may be prepared by contacting the substrate with an organic ion where the substrate is a solid while the organic ion is a liquid to form a solid-liquid mixture. The solid or solid-liquid mixture can be agitated to achieve a blended mixture by any means known to one of ordinary skill in the art. For example the solid mixture can be crushed with a mortar and pestle, and then agitated using an agitator or an ultrasonic mixer. In some embodiments, a solid-liquid mixture comprising the substrate, and organic ion may be blended and subsequently dried in an oven, or alternatively in a vacuum oven to form a dried mixture. The solid or the dried mixture can be further contacted with a metal-binding agent where the metal-binding agent is provided as either a solid or a liquid. The components may be mixed as previously described herein and may be contacted and blended in a fashion similar to that described for the contacting and blending of the organic ion and substrate. Additionally, process condition such as temperature, pressure, time, and the like may be adjusted as desired by one of ordinary skill in the art to meet the needs of the process.

Figure 2:
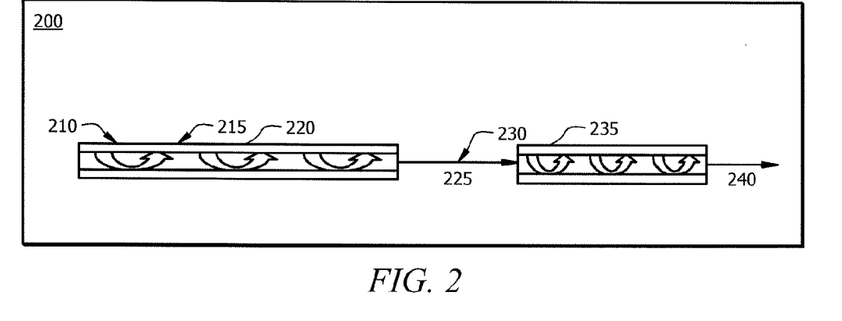
FIG. 2 is a schematic of a process flow diagram.

An embodiment of a process flow diagram for preparing the MRC is schematized in FIG. 2. Referring to FIG. 2, the process 200 comprises a substrate feed 210 and an organic ion feed 215 to a first mixer 220. All or a portion of the feed streams (e.g., feeds 210 and 215) to the process may be combined prior to reaching the mixers (e.g., mixer 220). The mixed composition from the first mixer is passed via flowline 225 to a second mixer 235. A metal binding agent feed 230 is added to the flowline 240, and/or may optionally be added at other locations in the process such as to mixer 220, mixer 235, or both. The MRC may exit the mixer 235 via flowline 240.

In an embodiment the MRC may be prepared by contacting the substrate, the organic ion, and the metal binding agent in any order desired by the user and, compatible with the components of the mixture. For example, with reference to FIG. 2, a method of preparing an MRC may comprise introducing substrate feed 210 to mixer 220, followed by the organic ion feed 215, and then the metal binding agent feed 230, as depicted in FIG. 2. Alternatively, the organic ion 215 may comprise the initial feed, followed by the substrate feed 210, and then the metal binding agent feed 230. In an embodiment, the MRC components may be fed through independent feedlines into mixers 220 mixer 230 where the MRC components may be combined. Alternatively, the components may be premixed in a feedline before entering the mixer where they may be further contacted. In an embodiment, two of the components may be premixed and/or stored in separate storage units, and premixed in a mixing unit before being feed to mixers 230. The premixing may be designed to produce certain characteristics (e.g. homogeneity) and as such the pre-mixing conditions (e.g., time period, agitation methods) may be chosen by one of ordinary skill in the art to meet the needs of the process. The mixers may be of any type known in the art and compatible with the disclosed process such as for example agitators or extruders. In an embodiment, the mixer is an extruder.

In an embodiment, a method of reducing the amount of metal in a MCS comprises contacting the MCS with an MRC of the type described herein. The MCS may be contacted with the MRC using any method known to one of ordinary skill in the art. The contacting may occur in a contacting zone. As used herein, the term contacting zone refers to any vessel, container, or unit wherein a user desired process occurs and wherein the process may comprise any number and/or type of interactions between its components (e.g. physical, chemical, etc. . . . ). In an embodiment, the contacting may be further assisted by agitation to achieve a blended mixture. In some embodiments, the MRC may a component of a fixed bed which is contacted with the MCS by flow of the MCS over the fixed bed. In such embodiments, additional conditions such as the flow rate of the MCS and the dimensions of the fixed bed may be chosen by one of ordinary skill in the art to meet the needs of the process. In an embodiment, the MCS and MRC may be contacted at a ratio of MCS:MRC of about 50:50, alternatively about 95:5, or alternatively about 99:1.

The contacting time may be varied to achieve a user desired result. In an embodiment, the contacting time may be equal to or greater than about 5 minutes, alternatively from about 5 to about 60 minutes or alternatively from about 15 to about 20 minutes.

In an embodiment, the contacting of the MCS and MRC may result in a solution having a metal content which is reduced in comparison to the MCS and is hereafter referred to as a solution having a lowered metal concentration (SLMC). In an embodiment, the method of reducing the amount of metal in a MCS may further comprise separating the SLMC from the MRC. Separation of the SLMC from the MRC may be accomplished by any means known to one of ordinary skill in the art for the separation of these type of compositions. For example, these compositions may be separated using techniques such as filtration, centrifugation, screening, particle settling, or combinations thereof. In an embodiment, the SLMC is separated from the MRC by filtration. Examples of suitable filtration methods include without limitation particle filtration, microfiltration, ultrafiltration, nanofiltration, and reverse osmosis.

In some embodiments, the SLMC once separated from the MRC may be introduced to another MRC to further reduce the metal concentration in the solution. For example, the SLMC may be introduced to a fresh MRC that has not been previously contacted with a MCS and result in the removal of at least a portion of any metal remaining in the SLMC.

In an embodiment, the contacting of the MRC and MCS and separation of the SLMC from the MRC may be carried out in a preexisting system compatible with such processes. For example, the MRC may be a component of a filter and may function as a component of a system designed to reduce contaminants in a solution. In some embodiments, such systems which comprise one or more contact zones comprising components for the removal of metals from an MCS may have an MRC introduced as an additional component to the system. Alternatively, at least a portion of the components of a preexisting system for the removal of metal from an MCS may be replaced by an MRC of the type disclosed herein. Examples of such systems include without limitation systems designed for water filtration, water purification, organic solvent filtration, glycerin purification, methanol purification, and oil based purification.

After the MRC has contacted the MCS and reduced the concentration of metal therein, the resulting mixture, hereinafter termed the spent MRC, may be disposed of; alternatively the spent MRC may be regenerated such as to produce an MRC that is capable of reacting with a MCS and reducing the metal concentration of the MCS. Methods of regenerating the spent MRC following exposure to the MCS may be carried out using any method known to one of ordinary skill in the art. For example, regeneration can be achieved by contacting (i.e. mixing, agitating, stirring) the spent MRC with a hydrophobic solvent such as hexanes, dichloromethane, or petroleum ether to produce a hydrophobic solution containing the metal bound to the metal binding agent (SMM) and a substrate/organic ion solid mixture (SO). The SMM and the SO may be separated by any method known to one of ordinary skill in the art for the separation of such compositions. The SO may then be reactivated by contacting it with a metal binding agent of the type and in the manner described herein.

The compositions and methods disclosed herein may result in a reduction in the metal content of the MCS of equal to or greater than about 75, 80, 85, 90, 95, 96, 97, 98, 99, or 100%.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

An MRC was prepared by mixing 61.6 g of bentonite (commercially available from BPM) with 48.7 g of bis-(hydrogenated tallow)-dimethyl-ammonium chloride. The mixture was blended and crushed with a mortar and pestle. Next, 40 ml of distilled water was added, and mixed for 30 minutes to form a blended slurry. The blended slurry was dried in an oven at 75° C. overnight. The dried mixture was then crushed using the mortar and pestle to a fine powder and weighted at 92.6 g. Next, 4.63 g of ter-dodecanethiol (5% w/w) was added to the fine powder, and mixed to achieve a well-blended mixture for 15 minutes. Next, 30 ml of distilled water was added, mixed for another 20 minutes, and dried in an oven at 75° C. for 12 hours to form the MRC.

Figure 3:
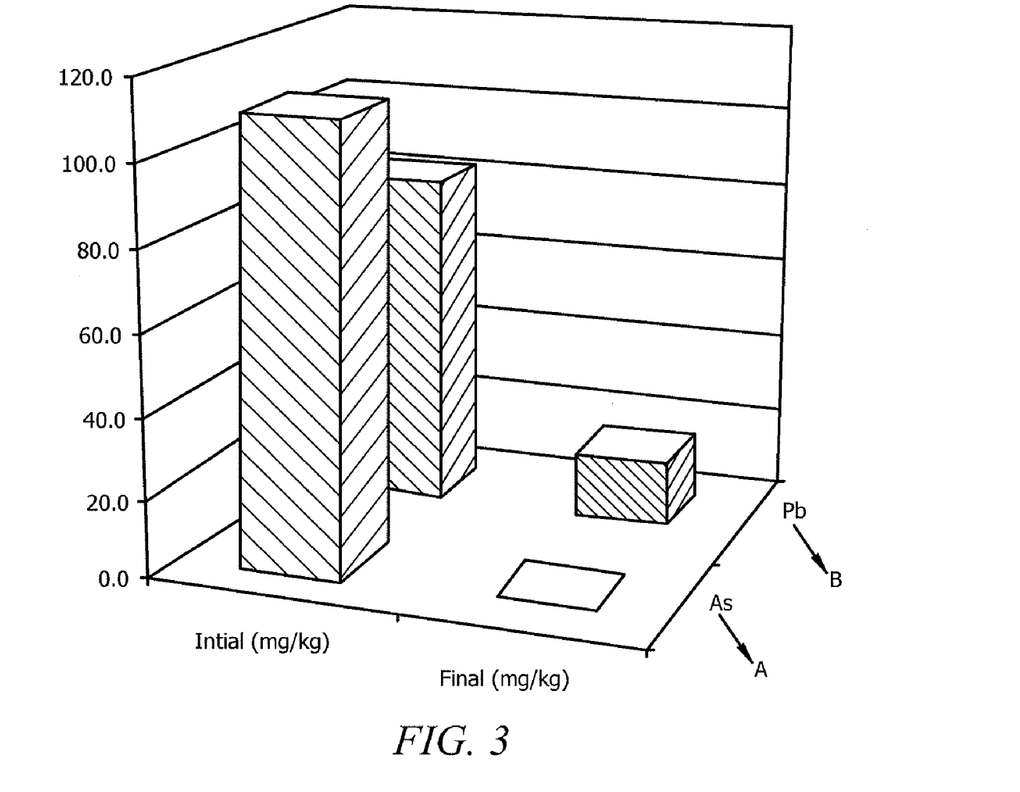
FIG. 3 is a plot of the amount of arsenic and lead in a metal-containing solution before and after treatment with a metal removing composition.

The removal of arsenic from an MCS containing arsenic was investigated. An MCS (50 ml) containing 110 ppm arsenic was placed in a beaker. Next, 1 g of the MRC prepared as described above was added into the beaker. The mixture was agitated to achieve a blended mixture. The final solution was analyzed for arsenic concentration by Induced Couple Plasma (ICP). FIG. 3A is a bar graph depicting the initial and the final arsenic concentration in the MCS treated with the MRC. The result demonstrates that after the treatment, the arsenic concentration level was below the detection limit of the ICP, which was below 0.008 ppm.

Example 2

The removal of lead from an MCS containing lead was investigated. The MRC prepared in Example 1 was used to treat an MCS containing 83 ppm lead. After the treatment, the lead concentration was analyzed by ICP and found to be 16 ppm. FIG. 3B is a bar graph depicting the initial and final lead concentration in the MCS treated with the MRC.

Example 3

Figure 4:
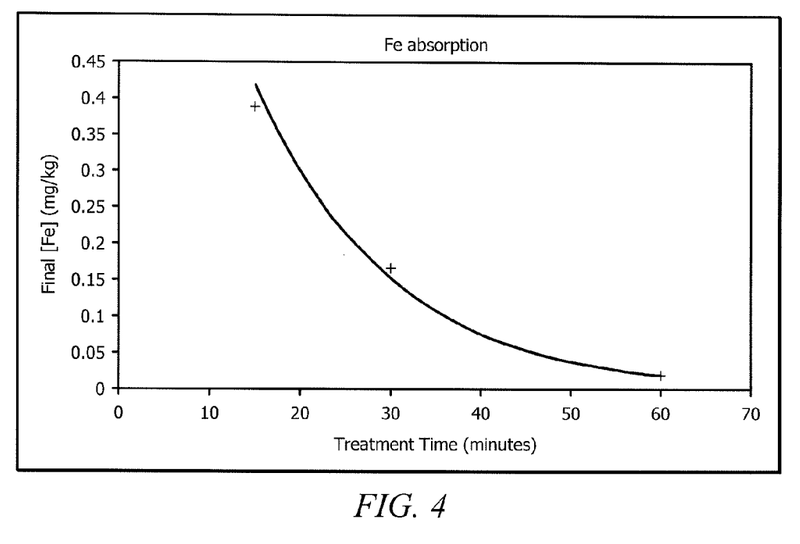
FIG. 4 is a plot of the amount of iron in a metal-containing solution as a function of treatment time with a metal-removing composition.

The removal of iron from an MCS containing iron was investigated. The MRC prepared in Example 1 was contacted with an MCS containing 2 ppm iron for about 60 minutes. The concentration of iron in the MCS was analyzed by ICP several times periodically within the 60 minute period. FIG. 4 is a plot of the exposure time against the iron concentration in the MCS. As observed in FIG. 4, the longer the exposure time, the lower the iron concentration in the MCS.

Example 4

The removal of multiple heavy metals from an MCS containing iron, lead, and arsenic was investigated. The MRC prepared in Example 1 was used to treat an MCS containing 10 ppm iron, 33.2 ppm lead, and 11 ppm arsenic. After exposure to the MRC, the final concentration of iron, lead, and arsenic was analyzed by ICP and found to be less than 0.002 ppm (below the detection limit of ICP), less than 0.006 ppm (below the detection limit of ICP), and 0.02 ppm respectively.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for removing a metal from a metal-containing solution comprising:
   contacting the metal-containing solution with a metal-removing composition comprising a substrate, an organic ion ionically bound to the substrate, and a metal binding agent hydrophobically associated with the organic ion, wherein the metal-binding agent comprises a mercaptan, a carboxylic acid, a chelating agent, or combinations thereof, wherein the mercaptan comprises tert-dodecanethiol, nonanethiol, octanethiol, or combinations thereof, and wherein the organic ion comprises imidazolium salts, phosphonium salts, bis-(hydrogenated tallow)-dimethyl-ammonium chloride, bis-(hydrogenated tallow)-benzyl-methyl-ammonium chloride, or combinations thereof, wherein at least a portion of the metal is bound to the metal binding agent during the step of contacting;
   separating the contacted metal-removing composition from the contacted metal-containing solution to recover a solution having a lowered metal concentration when compared to the metal-containing solution; and
   regenerating the contacted metal-removing composition by contacting the metal-removing composition with a hydrophobic solvent to remove the metal-binding agent having metal bound thereto from the organic ion ionically bound to the substrate followed by contacting the organic ion ionically bound to the substrate with additional metal-binding agent that is substantially free of any metal.

2. The method of claim 1 wherein the metal-containing solution comprises a metal, a heavy metal, or combinations thereof.

3. The method of claim 2 wherein the metal or heavy metal comprises lead, iron, arsenic, mercury, copper, manganese, chromium, barium, cadmium, selenium, antimony, beryllium, nickel, thallium, or combinations thereof.

4. The method of claim 2 wherein the metal and/or heavy metal is present in the metal-containing solution in an amount of equal to or less than about 10000 ppm.

5. The method of claim 1 wherein the substrate comprises a natural clay, a synthetic clay, a natural zeolite, a synthetic zeolite, a polymer resin, lignite, or combinations thereof.

6. The method of claim 5 wherein the clay comprises kaolinite, serpentine, illite, chlorite, smectite or combinations thereof.

7. The method of claim 6 wherein the smectite comprises montmorillonite, saponite, sepiolite, nontronite, beidellite, hectorite, fuller's earth, attapulgite, or combinations thereof.

8. The method of claim 5 wherein the zeolite comprises analcime, chabazite, heulandite, natrolite, phillipsite, stilbite, or combinations thereof.

9. The method of claim 5 wherein the polymer resin comprises diethyl aminoethyl, quaternary aminoethyl, or combinations thereof.

10. The method of claim 1 wherein the substrate is present in an amount of from about 30% to about 90% by weight of the metal-removing composition.

11. The method of claim 1 wherein the imidazolium salts comprise 4,5-dihydro-1-methyl-2-nortallow-alkyl-1-(2-tallow-amidoethyl)-imidazolium methyl sulfate, 1-ethyl-4,5-dihydro-3-(2-hydroxyethyl)-2-(8-heptadecenyl)-imidazolium ethyl sulfate, or combinations thereof.

12. The method of claim 1 wherein the organic ion is present in an amount of from about 10% to about 70% by weight of the removing composition.

13. The method of claim 1 wherein the chelating agent comprises amines, esters, carboxylic acids, alcohols, ethers, aldehydes, ketones, alkenes, alkynes, mercaptans, thiols, or combinations thereof.

14. The method of claim 1 wherein the carboxylic acid comprises n-stearic acid, iso-stearic acid, palmitic acid, or combinations thereof.

15. The method of claim 1 wherein the metal-binding agent comprises an alkyl group comprising from about 2 to about 30 carbons.

16. The method of claim 1 wherein the metal-binding agent is present in an amount of equal to or less than about 30% by weight of the removing composition.

17. The method of claim 1 wherein the metal-removing composition reduces the amount of metal in the metal-containing solution by equal to or greater than about 75%.

18. The method of claim 1 wherein the metal-containing solution comprises a metal, a heavy metal, or combinations thereof;
   wherein the substrate comprises a natural clay, a synthetic clay, a natural zeolite, a synthetic zeolite, a polymer resin, lignite, or combinations thereof; and
   wherein the organic ion comprises imidazolium salts, phosphonium salts, or combinations thereof.

19. The method of claim 1 wherein the metal-containing solution comprises lead, iron, arsenic, mercury, copper, manganese, chromium, barium, cadmium, selenium, antimony, beryllium, nickel, thallium, or combinations thereof;
   wherein the substrate comprises kaolinite, serpentine, illite, chlorite, smectite or combinations thereof;
   wherein the organic ion comprises bis-(hydrogenated tallow)-dimethyl-ammonium chloride, bis-(hydrogenated tallow)-benzyl-methyl-ammonium chloride, or combinations thereof; and
   wherein the metal-binding agent comprises carboxylic acids, mercaptans, thiols, or combinations thereof.

20. The method of claim 1 wherein the metal-containing solution comprises lead, iron, arsenic, mercury, copper, manganese, chromium, barium, cadmium, selenium, antimony, beryllium, nickel, thallium, or combinations thereof;
   wherein the substrate comprises montmorillonite, saponite, sepiolite, nontronite, beidellite, hectorite, fuller's earth, attapulgite, analcime, chabazite, heulandite, natrolite, phillipsite, stilbite, or combinations thereof;
   wherein the organic ion comprises 4,5-dihydro-1-methyl-2-nortallow-alkyl-1-(2-tallow-amidoethyl)-imidazolium methyl sulfate, 1-ethyl-4,5-dihydro-3-(2-hydroxyethyl)-2-(8-heptadecenyl)-imidazolium ethyl sulfate, or combinations thereof; and
   wherein the metal-binding agent comprises tert-dodecanethiol, nonanethiol, octanethiol, n-stearic acid, iso-stearic acid, palmitic acid, or combinations thereof.

21. The method of claim 1 wherein the metal and/or heavy metal is present in the metal-containing solution in an amount of equal to or less than about 10000 ppm;
   wherein the substrate is present in an amount of from about 30% to about 90% by weight of the metal-removing composition;
   wherein the organic ion is present in an amount of from about 10% to about 70% by weight of the removing composition; and
   wherein the metal-binding agent is present in an amount of equal to or less than about 30% by weight of the removing composition.

22. The method of claim 1 wherein the metal-containing solution and metal-removing composition are contacted at a ratio of metal-containing solution to metal-removing composition of about 50:50.

23. The method of claim 1 further comprising contacting the recovered solution with a second metal-removing composition and recovering a second solution having a lowered metal concentration when compared to the metal-containing solution.

24. The method of claim 1 wherein the substrate comprises bentonite and the organic ion comprises bis-(hydrogenated tallow)-dimethyl-ammonium chloride, bis-(hydrogenated tallow)-benzyl-methyl-ammonium chloride, or combinations thereof.

25. The method of claim 1 wherein the contacting is for a time period of from about 5 minutes to about 20 minutes.

* * * * *